Patented May 9, 1939

2,157,347

UNITED STATES PATENT OFFICE 2,157,347

PRODUCTION OF VINYL ETHERS DERIVED FROM CARBOHYDRATES

Walter Reppe and Otto Hecht, Ludwigshafen-on-the-Rhine, Germany, assignors to I. G. Farbenindustrie Aktiengesellschaft, Frankfort-on-the-Main, Germany No Drawing. Application August 8, 1936, Serial No. 95,036. In Germany August 24, 1935

5 Claims. (Cl. 260—90)

This invention relates to vinyl ethers derived from carbohydrates and to methods of producing the same.

It is known to produce vinyl ethers by acting acetylene at a temperature between about 80° and 250° C. on liquefied organic hydroxy compounds in a strongly alkaline medium.

We have found that ethers of the general formula $(R-O-C_2H_3)_x$ in which $R-O-$ stands for a radical of a carbohydrate or an acetalized or etherified carbohydrate and $x$ is a whole number representing the degree of polymerization are obtained by acting with acetylene at a temperature of between 80° and 250° C. and in the presence of a strongly alkaline reacting substance or of an organic base and a zinc or cadmium salt of a carboxylic acid on carbohydrates or on such derivatives of the same as still contain at least one free reactive hydroxyl group and are stable in the presence of basic substances at temperatures above 80° C., and subjecting, if desired, the resulting vinyl ethers to polymerization. In the case of the monomeric ethers the symbol $x$ of the above formula stands for 1, in the case of the polymeric ethers $x$ indicates the number of single molecules of the monomeric ether which are joined to the polymeric molecule. In the production of the monomeric vinyl ethers it is preferable not to start from the carbohydrates themselves but from their derivatives which are acetalized to a considerable extent, as for example beta-diacetone-fructose, mono-acetone-glucose or a mixture of beta-diacetone fructose and diacetone glucose, such as is formed by the treatment of can sugar with acetone and sulphuric acid, or the corresponding methylene, ethylidene or benzylidene acetals. Derivatives of carbohydrates which still contain hydroxyl groups and which have been prepared by etherification, as for example tetramethyl-glucose, are also suitable as initial materials.

The preparation of the vinyl ethers is brought about by causing acetylene diluted with inert gases, as for example nitrogen or hydrogen, to act under normal or increased pressure in the presence of strongly alkaline substances, such as oxides, hydroxides or alcholates of the alkali or alkaline earth metals or in the presence of an organic base, especially a tertiary base, as for example quinoline or pyridine, and a zinc or cadmium salt of a carboxylic acid, as for example zinc or cadmium acetate or butyrate, as catalysts on the carbohydrates or its above designed derivatives dissolved or suspended in a solvent or diluent or also on the fused compound itself.

The purification of the crude reaction products after distilling off the solvent is preferably accomplished by fractional distillation in a high vacuum. The vinyl ethers thus obtained are in part solid and crystalline and in part viscous balsam-like products. They are insoluble in water but readily soluble in organic solvents such as alcohols, glycols, glycol ethers, ketones, such as acetone or cyclohexanone, chlorinated hydrocarbons, such as ethylene chloride, chloroform or chlorbenzene, benzene hydrocarbons, such as benzene or toluene, and also in linseed oil. They are optically active.

The said vinyl ethers may be employed as softening or plasticizing agents for lacquers and plastic masses, or they may if desired be converted by hydrogenation into the corresponding ethyl ethers and used as such in a similar manner.

By polymerizing the monomeric vinyl ethers with the aid of suitable polymerization catalysts resinous products are obtained. Suitable polymerization catalysts are generally speaking the same which are used for polymerizing the vinyl ethers of the simple alcohols, as for example aluminium chloride, zinc chloride, boron fluoride as such or in the form of its addition or conversion products with ethers, carboxylic acids or alcohols, sulphur dioxide or substances having a large surface, such as bleaching earth. In order to obtain polymerization products of a high degree of polymerization carefully purified vinyl ethers of carbohydrates must be employed and the polymerization is carried out at low temperatures, preferably below 0° C. When polymerizing at high temperatures polymerization products of lower molecular weight are obtained. The polymerization products may be employed as such or in admixture with other substances (such as natural or synthetic resins or highly polymerized compounds, fillers, softening agents or dyestuffs) for the preparation of lacquers, films, foils or moulded articles.

The said monomeric vinyl ethers may also be polymerized by the known methods, as for example as such, in solution or in emulsion or suspension, together with other monomeric vinyl compounds, such as vinyl methyl ether, vinyl ethyl ether, vinyl octodecyl sulphide, N-diaryl vinyl amines, vinyl carbazole, acrylic acid esters, styrene, vinyl halides, vinyl esters, as for example vinyl acetate, acrylic nitrile and unsaturated ketones, such as vinyl methyl ketone. In this manner products are obtained which vary to a great extent in their properties and may be adapted to the particular purpose of use depending on the nature and number of initial materials and the polymerization conditions employed.

The following examples will further illustrate how this invention may be carried out in practice, but the invention is not restricted to these examples. The parts are by weight.

*Example 1*

1.5 parts of powdered potassium hydroxide are added to 50 parts of beta-diacetone-fructose (melting point 96° C.) and the whole treated in a shaking autoclave for 18½ hours at from 150° to 160° C. with acetylene diluted with nitrogen. Fresh acetylene is continually pressed in at the rate at which the pressure decreases. In all, 1 molecular proportion of acetylene is absorbed for each molecular proportion of beta-diacetone-fructose.

After cooling, the reaction product is rinsed out with acetone, the acetone distilled off at a pressure of about 50 millimeters (mercury gauge) and the residue distilled in a high vacuum. The boiling point is from 130° to 134° C. at from 3 to 4 millimeters (mercury gauge). The yield is 93 per cent of the theoretical yield.

The 1-vinyl-2.3.4.5-diacetone-fructo-pyranose (2.6) thus obtained is a pale-colored syrup which solidifies very rapidly giving beautiful crystals having a melting point of from 43° to 45° C. which are readily soluble in alcohol, acetone, benzene hydrocarbons, dibutyl ether and benzine.

The resulting vinyl ether may be readily polymerized by means of a solution of boron fluoride dihydrate in dioxane at about 0° C. to form a white resinous product which melts at 162° C. and is readily soluble in benzene hydrocarbons, chloroform, acetone, cyclohexanone, butyl acetate or ethylene glycol monoethyl ether. Its degree of polymerization amounts to 6 corresponding to a molecular weight of about 1700. The solutions of the polymerization product may be worked up into foils and coatings.

*Example 2*

A mixture of 50 parts of beta-diacetone-fructose, 50 parts of butanol and 1.5 parts of powdered caustic potash is subjected to treatment with acetylene at from 150° to 170° C. After the almost quantitative absorption of 1 molecular proportion of acetylene for each molecular proportion of beta-diacetone-fructose, the absorption ceases. The unchanged butanol and traces of butyl vinyl ether formed distil off under a pressure of from about 50 to 60 millimeters (mercury gauge) and the residue is fractionated in a high vacuum. The 1-vinyl ether of beta-diacetone-fructose is obtained in a yield which is 69 per cent of the theoretical yield.

*Example 3*

2.5 parts of powdered potassium hydroxide are added to a suspension of 50 parts of monoacetone-glucose in 125 parts of toluene, 80 parts of toluene are then distilled off, another 80 parts of toluene are added and again distilled off to remove last traces of water.

The residue is charged into a shaking autoclave and treated with acetylene at from 150° to 165° C. for 23 hours in the manner described in Example 1. About 1 molecular proportion of acetylene is absorbed for each molecular proportion of monoacetone-glucose and the absorption then ceases. After distilling off the toluene at about 80 millimeters pressure (mercury gauge), a highly viscous pale yellow syrup having a boiling point of from 140° to 180° C. at a pressure of from 3 to 4 millimeters (mercury gauge) is obtained by further fractionation. The purified reaction product yields when polymerized in the manner described in Example 1, a resinous product soluble in aliphatic alcohols containing more than 2 carbon atoms, cyclohexanone, glycol ethers and benzene hydrocarbons.

Etherified glucose, such as for example tetramethyl glucose, can be treated in the same manner, the corresponding vinyl ether being obtained.

*Example 4*

100 parts of butanol are added to 100 parts of the mixture of beta-diacetone-fructose and diacetone-glucose obtained by acetalizing by means of acetone and simultaneously splitting cane sugar (see Ohle, Berichte 57, 1572 (1924)). The butanol is distilled off in order to remove the water formed during the acetalization. 0.3 part of powdered potassium hydroxide is then added and the mixture treated with acetylene for 17½ hours at from 155° to 170° C. The amount of acetylene absorbed corresponds to about 2 molecular proportions. By fractionation in a high vacuum, 66.6 parts of a pale yellow syrup are obtained. The main fraction thereof, namely 37 parts, boils at from 134° to 145° C. at a pressure of 1 millimeter (mercury gauge) and has a refractive index $$n_D^{20}=1.4606$$

The syrup may be readily polymerized by means of a solution of boron fluoride in benzene at between 5° below zero C. and 5° C. to form a hard, pale yellow resin which has a softening point of 80° C. and is soluble in linseed oil and compatible with acetyl and nitro cellulose. It may be employed for preparing coating agents. Its degree of polymerization amounts to 4 corresponding to a molecular weight of about 1100.

Mixed polymerization products of the mixture of vinyl ethers obtained according to this example on the one hand and vinyl isobutyl ether on the other hand are also well compatible with acetyl and nitrocellulose.

The corresponding ethylidene, benzylidene or methylene acetals of the sugar may be treated with acetylene in the same manner as the said acetone-acetals, the corresponding vinyl ethers thus being obtained.

*Example 5*

135 parts of concentrated sulphuric acid are slowly dropped into a mixture of 525 parts of finely pulverized cane sugar and 825 parts of para-acetaldehyde. Care must be taken that the temperature does not rise higher than 30° C. The reaction mixture is stirred for from 20 to 30 hours while cooling with ice, then poured onto ice and neutralized against litmus by means of a caustic soda solution. 300 parts of butanol are added in order to separate more completely the aqueous layer containing sodium sulphate from the layer containing the acetal mixture formed. After standing for some time, the whole separates into 3 layers. The lower layer consists of a saturated sodium sulphate solution, the upper one of water and the middle one of a mixture of water, para-acetaldehyde, butanol and the ethylidene acetals of glucose and fructose formed in the reaction. The different layers are separated from each other, and from the middle one the readily volatile ingredients are removed by distilling at first under a pressure rising from about 50 to 100 millimeters (mercury gauge) and finally under a pressure of 5 millimeters mercury gauge. The said acetals remain as a from colorless to pale yellow syrup.

70 parts of the syrupy mixture of acetals thus obtained are added with 39 parts of pure, freshly distilled quinoline and 3.5 parts of calcined zinc acetate and the whole is treated with acetylene diluted with hydrogen in the ratio of 2 to 1 at from 153° to 168° C. under a pressure of about 20 atmospheres. The absorption of acetylene corresponds to the amount calculated with regard to the formation of monovinyl compounds of both, the diethylidene glucose and diethylidene fructose. The mixture of the vinyl ethers obtained can be distilled only with difficulty without decomposition occurring. The main fraction being a pale yellow or brownish liquor boils at from 145° to 156° C. under a pressure of 4 millimeters (mercury gauge) and has the refraction index $$n_D^{20}=1.474$$

The product thus obtained may be polymerized in the manner described in Example 4.

What we claim is:

1. 1-vinyl-2.3.4.5 - diacetone - fructo - pyranose (2.6).
2. A mixture of the monovinyl ethers of beta-diacetone fructose and diacetone glucose.
3. The polymerized mixture of the monovinyl ethers of beta-diacetone fructose and diacetone glucose.
4. As new products ethers corresponding to the general formular $(R-O-C_2H_3)_x$, in which $R-O-$ stands for a radical selected from the group consisting of the radicals of the acetals and ethers mono- and di-saccharides, and $x$ stands for a whole number representing the degree of polymerization.
5. As new products ethers corresponding to the general formula $R-O-CH=CH_2$ in which $R-O-$ stands for a radical selected from the group consisting of the radicals of the acetals and ethers of mono- and di-saccharides.

WALTER REPPE.
OTTO HECHT.